April 24, 1962
W. C. BELK
3,031,081
APPARATUS FOR SEPARATING THICK-SKINNED CITRUS
FRUIT FROM THIN-SKINNED CITRUS FRUIT
Filed Nov. 19, 1958
4 Sheets-Sheet 2
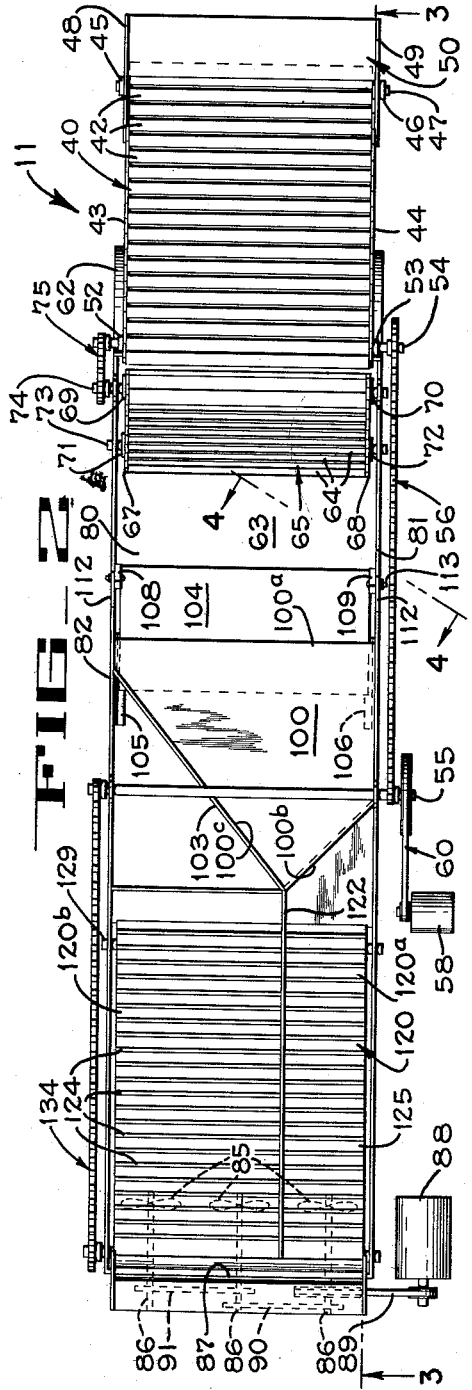
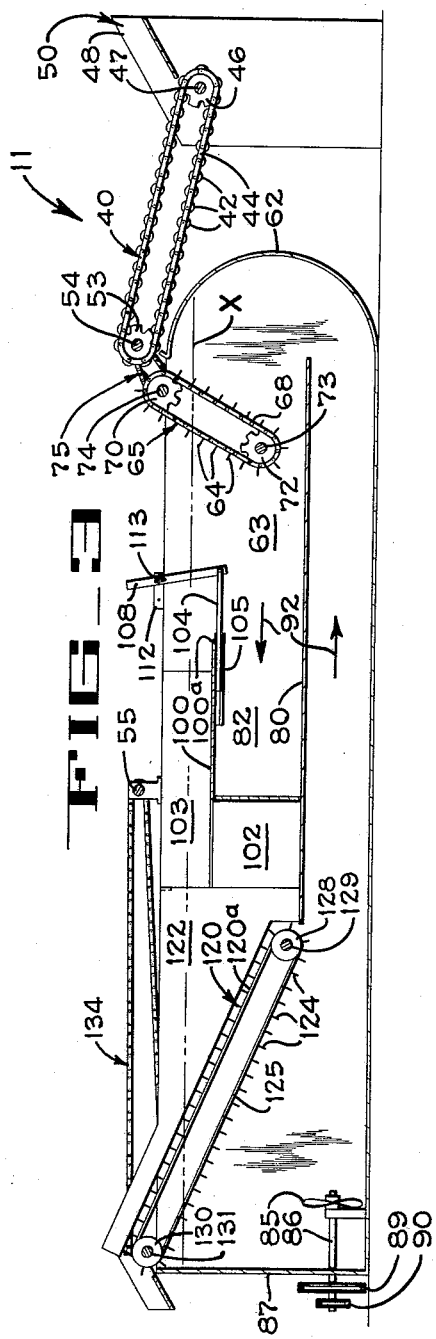
INVENTOR
WILBER C. BELK
BY Hans G. Hoffmeister
ATTORNEY

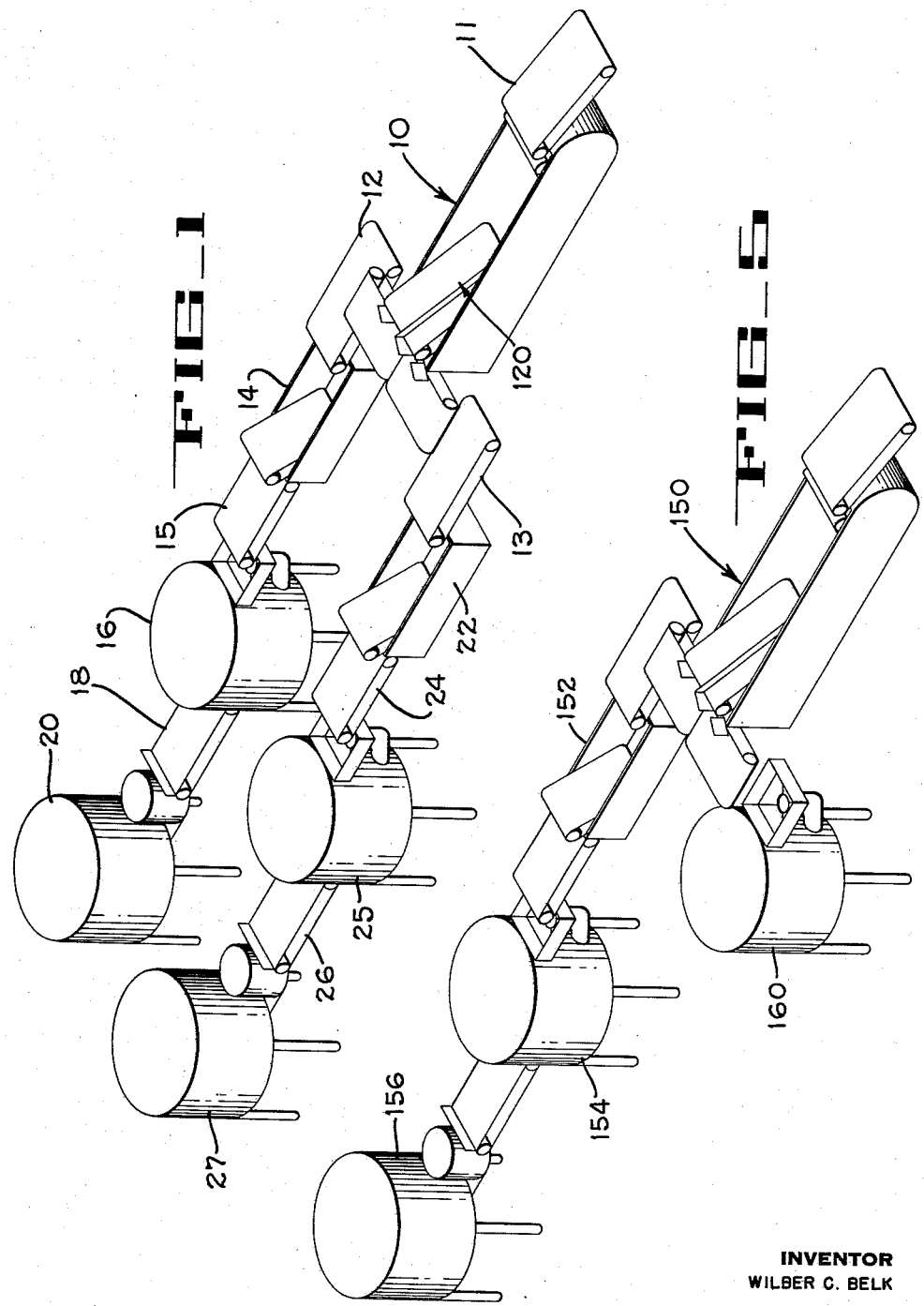

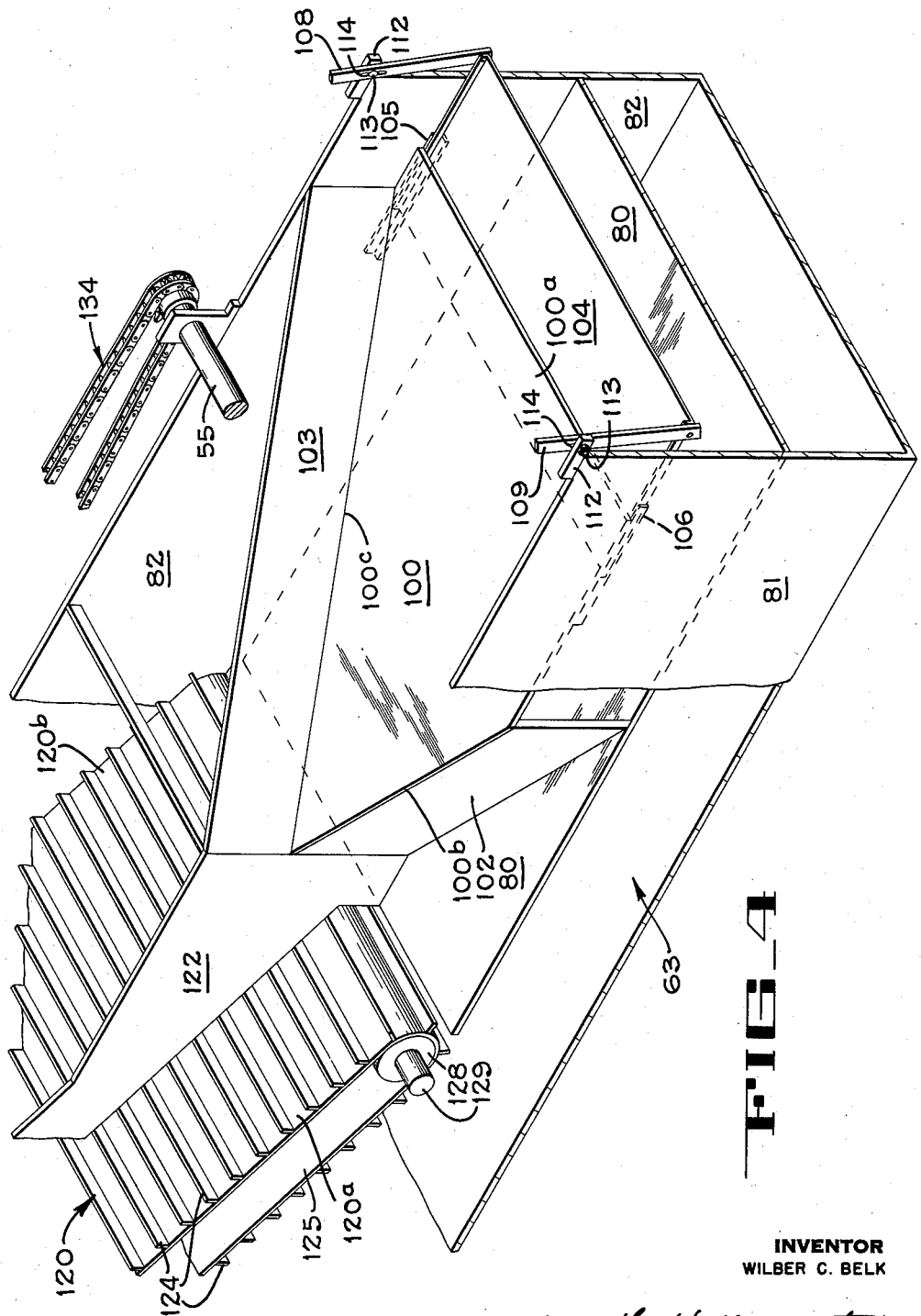

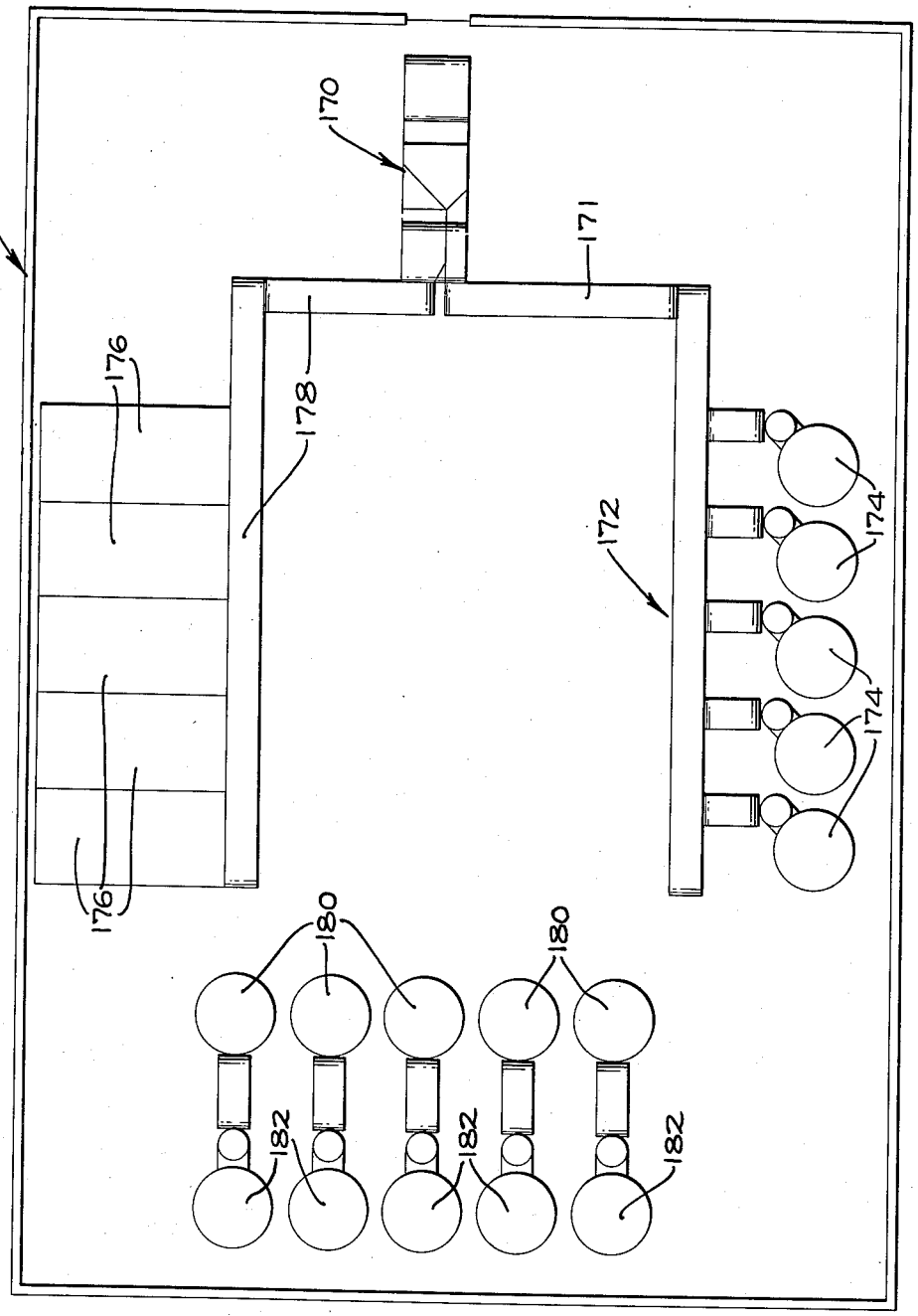

United States Patent Office 3,031,081
Patented Apr. 24, 1962

3,031,081
APPARATUS FOR SEPARATING THICK-SKINNED CITRUS FRUIT FROM THIN-SKINNED CITRUS FRUIT
Wilber C. Belk, Lakeland, Fla., assignor to FMC Corporation, a corporation of Delaware
Filed Nov. 19, 1958, Ser. No. 775,005
3 Claims. (Cl. 209—173)

This invention pertains to a method of processing citrus fruit and to apparatus for carrying out the processing of citrus fruit.

Grapefruit and other citrus fruit are prepared for commercial canning by subjecting the fruit to a blanching operation, peeling the blanched fruit, and then separating the fruit into sections. One important function of the blanching operation is the preparation of the skin so that it can be peeled most efficiently. It has been found that the skin of grapefruit blooming in the later part of a growing season may be twice as thick as the skin of early-blooming grapefruit. All the grapefruit is picked at the same time and forwarded to the processing plant as a lot. If the entire lot is subjected to a blanching operation adapted for fruit having thick skins, the fruit having thin skins is overcooked and it becomes impossible to efficiently peel and sectionize such fruit. On the other hand, if the blanching operation is suitable for the blanching of fruit having thin skins, the fruit having thick skins is not adequately prepared for the peeling and sectionizing operations.

Accordingly, it is an object of the present invention to provide an improved method of processing grapefruit or the like, said process being operative on the grapefruit from the time it is delivered to the processing plant until the time the grapefruit is ready to be placed in cans.

Another object is to provide a method of separating grapefruit or the like according to skin thickness.

Another object is to provide an improved apparatus for processing grapefruit or the like.

Another object is to provide an apparatus for separating citrus fruit according to skin thickness.

Other and further objects and advantages of the present invention will become apparent from the following description taken in connection with the accompanying drawings, in which:

FIG. 1 is a diagrammatic perspective of a fruit processing system adapted to carry out the process of the present invention.

FIG. 2 is an enlarged diagrammatic plan of the portion of the apparatus of FIG. 1 that is particularly adapted for separating citrus fruit according to skin thickness.

FIG. 3 is a diagrammatic vertical section taken along line 3—3 of FIG. 2.

FIG. 4 is an enlarged perspective of a portion of the fruit separating apparatus of FIG. 2, the view being taken looking in the direction of arrows 4—4 of FIG. 2.

FIG. 5 is a diagrammatic perspective showing an arrangement for carrying out a second embodiment of the process of the present invention.

FIG. 6 is a diagrammatic plan showing an arrangement for carrying out a third embodiment of the process of the present invention.

The fruit processing apparatus of the present invention comprises a fruit separating unit 10 (FIG. 1) arranged to receive a quantity of grapefruit, or other citrus fruit from a feed conveyor 11. The unit separates the fruit according to skin thickness and delivers grapefruit having a first range of skin thickness to a conveyor 12 and grapefruit having a second range of skin thicknesses to another conveyor 13. The conveyor 12 delivers the grapefruit into a blanching unit 14 where the fruit is subjected to a blanching treatment. During this treatment the grapefruit is subjected to a blanching medium, such as steam or hot water at a predetermined temperature. The duration of the treatment and the temperature of the blanching medium is such that grapefruit, having skin thicknesses in said first range of thicknesses, will be given a predetermined optimum blanching without overcooking of the fruit. Accordingly, the skin of the fruit is in condition for most effective peeling when it leaves the blanching unit 14, and the flesh of the grapefruit is in the firm condition which makes efficient sectionizing possible. Upon being discharged from the blanching unit 14, the grapefruit are carried by a conveyor 15 to a feed station of a peeling machine 16, the mechanism of which have been particularly adjusted to handle fruit having skin thicknesses in said first range of thicknesses. After being peeled, the fruit are carried by conveyor 18 to a sectionizing machine 20 which divides the firm fruit into a plurality of sections suitable for canning.

In a similar manner, the conveyor 13 delivers the fruit having skin thicknesses in said second range to a blanching unit 22 in which the fruit is subjected to a blanching treatment particularly designed for fruit having such skin thicknesses. Upon being discharged from unit 22, the fruit is carried by conveyor 24 to the feed station of a peeling unit 25 and, after being peeled, the fruit is carried by a conveyor 26 to a sectionizing machine 27.

The sectionizing machines 20 and 27 may be of the type disclosed in the U.S. application for patent of Hans W. Grotewold, Serial No. 730,335, filed April 23, 1958. The peeling machines 16 and 25 are preferably of the type disclosed in the U.S. application for patent of Polk et al., Serial No. 466,104, filed November 1, 1954, now Patent No. 2,958,356. The blanching units 14 and 22 may be of any commercial type.

The feed conveyor 11 (FIGS. 2 and 3) comprises an endless belt 40 made up of a plurality of transverse rods 42 secured at their opposite ends to two chains 43 and 44. Idler sprockets 45 and 46 are journalled on a shaft 47 which extends between side walls 48 and 49 of a feed chute or hopper 50. Drive sprockets 52 and 53 are keyed to a shaft 54 that is driven by a shaft 55 through a sprocket and chain drive arrangement 56. The shaft 55 is in turn driven by a motor 58 through a belt and pulley drive 60.

The feed conveyor 11, which receives the fruit after it has been graded as to size, is arranged to discharge the fruit over the forward wall 62 of a tank 63 of the fruit separator 10. The fruit is deposited on flat flights 64 of a conveyor 65 which is arranged to confine the fruit between adjacent flights 64 and positively carry the fruit down into the liquid in the tank. The fruit lowering conveyor 65, which will be called a lowerator, comprises a pair of spaced endless chains 67 and 68 between which the flights 64 are secured in such a manner that the flights are rigidly held in a position projecting outwardly from the descending run of the lowerator. The chains 67 and 68 are trained around drive sprockets 69 and 70, respectively, and around idler sprockets 71 and 72, respectively. The idler sprockets are journalled on a shaft 73 and the drive sprockets are keyed to a shaft 74 that is driven by shaft 54 through a chain and sprocket drive 75. When the flights of the lowerator move around the lower idler shaft 73 they move away from each other to an open position to discharge the confined fruit into the liquid in the tank.

The liquid in the tank, which is maintained at a level indicated by phantom line X is an emulsion formed of water and mineral spirits and has a specific gravity in the range between .90 and .92. A horizontal partition 80 (FIG. 3) extends across the tank from one side wall 81 to the other side wall 82. Three impellers 85 (FIG. 2) are mounted in the tank on shafts 86, that project through a rear wall 87 of the tank and are driven by a variable speed motor 88 through belt and pulley drives 89, 90 and 91. When the impellers 85 are operating, the liquid is circulated in a counterclockwise direction, indicated by arrows 92, around the horizontal partition 80.

When fruit is released from the lower end of the lowerator 65, it will float in the liquid at a level dictated by its specific gravity. Then, as the fruit is carried along by the moving liquid, the fruit will pass above or below a horizontal partition or dividing plate 100 depending upon the level at which it is floating. As seen in FIGS. 2 and 4, the partition 100 is generally triangular in configuration, having a forward portion 100a secured to the side walls 81 and 82 of the tank, a rear slanted edge portion 100b secured to a vertical partition 102 extending upwardly from the tank partition 80, and a slanted edge portion 100c on which is supported a second slanted vertical partition 103. An extension of the forward portion 100a is provided by a plate 104 that is slidably disposed between the undersurface of partition 100 and inwardly projecting horizontal legs of angle bars 105 and 106 that are secured to the inner surface of side walls 81 and 82, respectively. The extension 104 may be adjusted relative to the partition 100, to change the position of the leading edge of the partition, by means of two levers 108 and 109 that are pivotally connected at their lower ends to the extension 104 and are pivoted intermediate their ends on mounting bars 112 secured to the tank walls 81 and 82. A bolt 113 extends through each mounting bar and through a slot 114 in each lever, and each bolt is fitted with a suitable nut and lock washers to hold the extension in selected, adjusted position.

Fruit, that passes above the partition 100, is diverted laterally by the vertical partition 103 and is guided to a portion 120a of an elevator 120 which has a portion 120b on the other side of a vertical partition 122. The elevator 120, which raises the fruit out of the tank, comprises a plurality of slats or flat bars 124 secured to an endless belt 125 (FIG. 4). The belt 125 is trained around an idler roller 128 journalled on a shaft 129 and around a drive roller 130 keyed to a shaft 131 that is driven by shaft 55 by means of a chain and sprocket drive 134.

The fruit that is carried under the partition 100 (FIG. 4) is diverted laterally by the vertical partition 102 and is directed onto portion 120b of the elevator 120 to be lifted out of the tank. It will be seen that the separating unit 10 will separate fruit into two groups which are determined by the level at which the fruit floats in the liquid. It is evident that, if two grapefruit are of approximately the same size and one grapefruit has a skin that is twice as thick as the skin of the second grapefruit, the thick-skinned grapefruit is less dense and will float higher in a liquid than the thin skinned grapefruit. Accordingly, by properly selecting the specific gravity of the liquid, the grapefruit can be made to float at different levels according to their peel thickness.

It has been found that a liquid having a specific gravity in the range of from .90 to .92 is effective, when used in connection with the present machine to separate grapefruit into two groups, one of which consists of grapefruit having a skin thickness in a first range, called a normal thickness range, and the other of which consists of grapefruit having a skin thickness in a second range that is thicker than the normal range.

If the specific gravity of the liquid is relatively high, as for example .90, grapefruit that is dropped directly into the liquid without using a lowerator, as 65, will tend to remain at an upper level and will not have a chance to sink downwardly to its proper level before it reaches the partition 100. Accordingly, if the fruit is dropped directly into the tank, the liquid should have a specific gravity of approximately .85. Such a liquid will permit the fruit to sink initially to a level at which it can begin its level-seeking movement and reach the level dictated by its skin thickness before the partition 100 is reached. As previously mentioned, when the lowerator 65 of the present invention is used, the fruit is positively carried downwardly under the surface of the liquid and is released at an advantageous point where it can immediately begin its level-seeking action. Accordingly, when the fruit is introduced into the tank by the lowerator, a liquid having a specific gravity in the range of .90 to .92 may be used. Since a solution, such as mineral spirits, must be added to water to lower the specific gravity of the water, it is obviously less expensive to obtain a tank of liquid having a .92 specific gravity than a tank of liquid having .85 specific gravity. Accordingly, the lowerator makes possible a particularly economical installation.

Referring to FIG. 1, it will be seen that, after being separated according to skin thickness in the separator 10, each group of grapefruit is directed to a blanching unit 14 or 22 wherein it is subjected to a blanching treatment that is particularly suitable, in the matter of the temperature and the duration of the treatment, for grapefruit having the range of skin thickness characteristic of that group. After being subjected to this advantageous blanching treatment, the skin of the grapefruit is in a desirable condition for peeling in the peeling unit 16 or 25 and the flesh of the grapefruit is firm and suitable for a sectionizing operation.

In FIG. 5 an arrangement is shown that is adapted to carry out another embodiment of the processing method of the present invention. In this arrangement, grapefruit is separated into two groups in a separator unit 150, which is identical to unit 10. The first group will have fruit with a thickness greater than normal and this group is directed to a blancher 152, then to a peeling unit 154, and finally to a sectionizer 156. The thick-skinned fruit of the second group are directed to a juice extracting machine 160 which may be of any commercial form. Thus, this second process consists of separating grapefruit into two groups according to skin thickness and directing the fruit having normal skin thickness through suitable blanching, peeling, and sectionizing machines and directing the thick-skinned grapefruit to a juicer.

In FIGURE 6 a system for processing grapefruit, using the fruit-separating apparatus of the present invention, is illustrated. When the grapefruit is brought from the field to the cannery 168, in trucks or the like, they are immediately directed into a separator 170 where the fruit are separated according to skin thickness. The thick-skinned fruit are directed by a conveyor 171 to a juicer station 172 where a plurality of juice-extracting machines 174 process the fruit. The fruit having normal skin thickness are directed to storage bins 176, either by a conveyor 178 or any other suitable transporting means. The fruit are held in the storage bins for aging for a period of from two to four days and are then processed in peeling and sectionizing machines 180 and 182, respectively.

It will be apparent that, since all fruit to be sectionized and canned must be held in bins for from two to four days, the provision of bin space in a cannery becomes a problem at the time the fruit is harvested. In accordance with the present invention, thick-skinned fruit, that is undesirable for canning, is immediately separated out and subjected to a juicing operation for which no aging of the fruit is required. Thus the amount of fruit to be stored in bins is greatly reduced and much less storage space is required. This entire method of processing citrus fruit is made possible by the separator of the present invention which is effective to separate the fruit according to skin thickness.

From the foregoing description it will be apparent that the present invention provides a novel, efficient method of processing grapefruit, said method being dependent upon the new concept of separating citrus fruit according to skin thickness. The use of a lowerator makes possible an efficient separation of the grapefruit in a relatively economical liquid. The adjustable extension on the main fruit separating partition provides means for coordinating the permissible distance a grapefruit may travel with the rate of flow of the liquid and the lifting power of the liquid.

It will be understood that modifications and variations may be effected without departing from the scope of the present invention. Accordingly, it will be understood that the invention is limited only by the scope and proper interpretation of the annexed claims.

Having thus described by invention, what I claim as new and desire to protect by Letters Patent is:

1. Apparatus for segregating a random mixture of substantially uniformly sized citrus fruit including a first group having a skin of predetermined thickness and a second group having a skin of thickness measurably different from said predetermined thickness comprising a tank containing a bath of liquid having a specific gravity in the range of from 0.85 to 0.92, means for forcing the liquid to flow in a predetermined rearward direction in said tank, a horizontal partition having a leading edge, said partition being mounted in said tank below the upper level of the liquid to divide the tank into an upper flow passage and a lower flow passage and so that the liquid flows rearwardly past said edge, and a lowerator having opposite sides and upper and lower ends, the lowerator including a lower shaft journalled in the tank, the shaft being in downwardly and forwardly spaced, substantially parallel relation to said leading edge, the lowerator also including an upper shaft journalled in the tank above the lower shaft, spaced pairs of sprockets connected to said shafts on opposite sides of the lowerator, endless chains trained around the sprockets on corresponding sides of the lowerator, elongated flat flights interconnecting the opposite chains with adjacent flights being in uniformly spaced relation to each other, there being a descending run of flights in opposed relation to said leading edge, said spaced flights permitting moving liquid to pass therebetween for movement toward said leading edge, said adjacent flights moving apart during travel around said upper sprockets to receive fruit therebetween, said flights moving toward each other during travel downwardly along said descending run to confine the received fruit between the flights, and said flights moving apart during travel around said lower sprockets to release the fruit into the liquid at a predetermined position downwardly and forwardly spaced from said leading edge.

2. Apparatus for separating relatively less dense thick-skinned grapefruit from thin-skinned grapefruit of greater density than said thick-skinned grapefruit or the like comprising a tank containing a bath of liquid having a specific gravity in the range of from 0.85 to 0.92, means for moving said liquid in a stream and at a predetermiend speed in said tank, a horizontal partition disposed in said tank below the level of the upper surface of the liquid, the partition having a leading edge toward and past which the stream moves, and feed means for placing grapefruit at a predetermined depth in said liquid upstream from and closely adjacent to the leading edge of said partition.

3. An apparatus for separating thick-skinned citrus fruit from citrus fruit having relatively thin skin comprising a tank containing a bath of liquid with a specific gravity in the range from 0.90 to 0.92, a horizontal partition mounted in said tank below the level of the liquid to provide an upper and a lower flow passage in said tank and having a horizontal leading edge, means immersed in the liquid for moving the liquid rearwardly over and under the partition and past said leading edge, and a conveyor extended downwardly into the tank and terminating forwardly adjacent to said leading edge for grasping both thick and thin skinned fruit, for carrying such fruit downwardly into the liquid, and for releasing all of said fruit at a predetermined position forwardly and downwardly adjacent to said leading edge whereby said thick and thin skinned fruit float to elevations respectively above and below said leading edge and are carried rearwardly over and under said partition by said moving liquid.

References Cited in the file of this patent

UNITED STATES PATENTS

| | | |
|---|---|---|
| 1,186,677 | Parker | June 13, 1916 |
| 1,885,988 | Chapman | Nov. 1, 1932 |
| 1,992,398 | Ryder | Feb. 26, 1935 |
| 2,054,949 | Robinson et al. | Sept. 22, 1936 |
| 2,238,997 | Gaymon | Apr. 22, 1941 |
| 2,283,512 | Sias | May 19, 1942 |
| 2,549,333 | Polk et al. | Apr. 17, 1951 |
| 2,556,385 | Allan | June 12, 1951 |
| 2,781,070 | Kilburn et al. | Feb. 12, 1957 |
| 2,828,860 | Morris | Apr. 1, 1958 |